(12) United States Patent
Nagata (10) Patent No.: US 9,712,245 B2
(45) Date of Patent: Jul. 18, 2017

(54) OPTICAL TRANSMISSION MODULE (71) Applicant: Hosiden Corporation, Yao-shi (JP)

(72) Inventor: Takayuki Nagata, Yao (JP)

(73) Assignee: Hosiden Corporation, Osaka (JP)

( * ) Notice: Subject to any disclaimer, the term of this patent is extended or adjusted under 35 U.S.C. 154(b) by 85 days.

(21) Appl. No.: 14/711,083

(22) Filed: May 13, 2015

(65) Prior Publication Data

US 2015/0333832 A1 Nov. 19, 2015

(30) Foreign Application Priority Data

May 14, 2014 (JP) ................. 2014-100421

(51) Int. Cl.
*H04B 10/25* (2013.01)
*H04B 10/50* (2013.01)
*G02B 6/42* (2006.01)

(52) U.S. Cl.
CPC ........... *H04B 10/501* (2013.01); *G02B 6/428* (2013.01); *H04B 10/2504* (2013.01)

(58) Field of Classification Search
CPC .......................... H04B 10/501; H04B 10/2504
See application file for complete search history.

(56) References Cited

U.S. PATENT DOCUMENTS

| 4,854,659 | A | 8/1989 | Hamerslag et al. |
| 2002/0080457 | A1 | 6/2002 | Nakanishi et al. |
| 2003/0007749 | A1 | 1/2003 | Hurt et al. |
| 2005/0094694 | A1* | 5/2005 | Fujihara ................. G11B 7/127 372/43.01 |
| 2010/0044723 | A1* | 2/2010 | Yamamoto ........... G02B 6/4214 257/82 |
| 2012/0002284 | A1* | 1/2012 | McColloch .......... G02B 6/4206 359/558 |
| 2012/0025210 | A1* | 2/2012 | Saeki .................. H01S 5/02244 257/81 |
| 2013/0170790 | A1 | 7/2013 | Yasuda et al. |
| 2013/0209027 | A1 | 8/2013 | Yu et al. |
| 2013/0279861 | A1 | 10/2013 | Hashiguchi |
| 2014/0326861 | A1* | 11/2014 | Lee ......................... G02B 6/12 250/227.11 |

FOREIGN PATENT DOCUMENTS

| JP | 2002261300 A | 9/2002 |
| JP | 2008299098 A | 12/2008 |
| JP | 2013152427 A | 8/2013 |
| JP | 2013225011 A | 10/2013 |
| WO | 9826885 A1 | 6/1998 |
| WO | 0157572 A2 | 8/2001 |

* cited by examiner

*Primary Examiner* — Dzung Tran
(74) *Attorney, Agent, or Firm* — The Webb Law Firm (57) ABSTRACT

Provided is an inexpensive and compact optical transmission module having high coupling efficiency between an optical fiber and a light projecting element and/or a light receiving element. This optical transmission module includes a lead frame including an electric wiring pattern formed therein, a resin housing formed through insert-molding of the lead frame, and an electric device mounted on the lead frame and including a light projecting element for photoelectric conversion. The lead frame forms a slit positioning an optical fiber to be coupled and a reflection mirror reflecting and condensing light from the light projecting element to the optical fiber.

12 Claims, 9 Drawing Sheets

OPTICAL TRANSMISSION MODULE

CROSS REFERENCE TO RELATED APPLICATION

This application is based on and claims priority under 35 U.S.C. Section 119 to Japanese Patent Application No. 2014-100421 filed on May 14, 2014, the entire contents of which are incorporated herein by reference.

Technical Field

This disclosure relates to an optical transmission module.

Related Art

At terminal end portions of an optical fiber cable used for optical communication, there are employed optical transmission modules to be connected to a light projecting element or a light receiving element and used for photoelectric conversion. In recent years, there has been increasing use of optical communication capable of transmitting a great amount of data at a high speed. And, there is a need for manufacture of a more economical and more compact optical transmission module.

Conventionally, as a base for forming therein a V-groove for mounting an optical fiber and mounting thereon electronic devices such as a light projecting element, a light receiving element, etc., a silicon optical bench (to be referred as "SiOB" hereinafter) has been employed. SiOB is in general use for its good heat discharging performance, but it is expensive. Further, for mounting the above-described electronic devices on an SiOB, it is necessary to oxidize a surface of the SiOB for forming a metal membrane thereon and then to etch the membrane to form a wiring pattern, before mounting. In this way, a large number of steps would be required for its manufacture. For these reasons, an optical transmission module using an SiOB has been expensive.

In view of the above, there have been proposed an optical transmission module wherein a metal wiring pattern is formed on a base formed of resin base and electronic devices are mounted thereon (see Japanese Unexamined Patent Application No. 2013-152427) and a further optical transmission module wherein with insert molding of a lead frame formed of metal, a resin structure is formed and electronic devices are mounted on the lead frame exposed therein (see Japanese Unexamined Patent Application No. 2013-225011). These optical transmission modules, as not using an SiOB, can be manufactured less costly than optical transmission modules using an SiOB.

SUMMARY

The optical transmission module according to Japanese Unexamined Patent Application No. 2013-152427 does not use any SiOB, but requires such steps as removing any unneeded metal layer through etching after forming a plurality of metal layers on the resin base, in order to form a wiring pattern and/or a reflection face for reflecting light. The increased number of steps may invite cost increase of the optical transmission module. Further, an even greater number of steps are needed since an accommodating portion for mounting an optical fiber and an inclined face to constitute a reflection face are formed by irradiation with laser beam. From this viewpoint too, it has been difficult to provide an optical transmission module inexpensively.

The optical transmission module according to Japanese Unexamined Patent Application No. 2013-225011 uses a lead frame formed of metal. However, its use is limited to portions mounting a surface light emitting element and a surface light receiving element. The electronic devices other than the surface light emitting optical element and the surface light receiving element (e.g. a driver IC, etc.) are mounted on a different base. And, this base and the resin structure are bonded to each other by such a technique as adhesion, thereby to constitute the optical transmission module. Accordingly, the step of bonding is required, thus leading to cost increase as well as enlargement of the optical transmission module as a whole.

Further, in the case of the optical transmission module according to Japanese Unexamined Patent Application No. 2013-225011, the V-groove for mounting an optical fiber and the reflection face for reflecting light are formed by means of molding in the resin structure. Thus, position precision of these members was poor, so that there was concern of deterioration in a coupling efficiency between the optical fiber and the surface light emitting element/surface light receiving element.

As described above, there has been room for further improvement in the configuration of optical transmission module.

An embodiment of this disclosure discloses an inexpensive and compact optical transmission module having high coupling efficiency between an optical fiber and a light projecting element and/or a light receiving element.

According to one embodiment of an optical transmission module relating to this disclosure, an optical transmission module comprises:

a lead frame including an electric wiring pattern formed therein;

a resin housing formed through insert-molding of the lead frame;

an electric device mounted on one face of the lead frame and including a light projecting element and/or light receiving element for photoelectric conversion; and the lead frame forming a slit positioning an optical fiber to be coupled to the light projecting element and/or light receiving element, and a reflection mirror reflecting light from the light projecting element to the optical fiber and/or light from the optical fiber to the light receiving element.

With the above-described embodiment, since a lead frame is used instead of an SiOB which was used conventionally, it is possible to manufacture an optical transmission module inexpensively. Further, since a slit for positioning an optical fiber and a reflection mirror reflecting light signal are formed in the lead frame, positional precision of the slit and the reflection mirror is higher, compared with the arrangement of forming these in resin. Also, there is no need for employing any additional members for positioning of the optical fiber or forming of the reflection mirror. Moreover, since the electronic device is mounted directly on the lead frame, three is no need for additional wiring also. With these combined, it has become possible to manufacture an inexpensive and compact optical transmission module having high coupling efficiency between an optical fiber and a light projecting element and/or a light receiving element.

According to a further embodiment of the optical transmission module relating to this disclosure, on the other face of the lead frame, a contact for input/output of an electric signal is provided.

With the above-described arrangement of the further embodiment, there is no need for forming a contact by any additional member or providing any additional wiring. As a result, it is possible to manufacture the optical transmission module even more inexpensively and compactly.

According to a still further embodiment of the optical transmission module relating to this disclosure, the lead frame is formed by press work and the reflection mirror is formed by surface machining during the press work.

With the above-described arrangement of the further embodiment, since the lead frame is formed by a press work, this lead frame can be manufactured inexpensively. Further, since the reflection mirror is formed simultaneously by surface machining, the reflection mirror can be formed with high precision and also there is no need for such additional step as leaser irradiation or dicing for forming the reflection mirror. So, the optical transmission module can be manufacture even more inexpensively.

According to a still further embodiment of the optical transmission module relating to this disclosure, the lead frame is formed by press work and the reflection mirror is formed by bending during the press work.

With the above-described arrangement of the further embodiment, since the lead frame is formed by a press work, this lead frame can be manufactured inexpensively. Further, since the reflection mirror is formed simultaneously by bending, the reflection mirror can be formed favorably even when the lead frame has only a small plate thickness. Further, there is no need for such additional step as leaser irradiation or dicing for forming the reflection mirror. So, the optical transmission module can be manufacture even more inexpensively.

According to a still further embodiment of the optical transmission module relating to this disclosure, the electronic device includes a surface emitting laser as the light projecting element, a photodiode as the light receiving element, a driver for driving the surface emitting laser, and a transimpedance amplifier converting a current from the photodiode into a voltage and outputting this voltage.

With the above-described embodiment configuration, it is possible to constitute a circuit for photoelectric conversion inexpensively.

DESCRIPTION OF EMBODIMENTS

1. Configuration of Transmitting Optical Transmission Module

Figure 1:
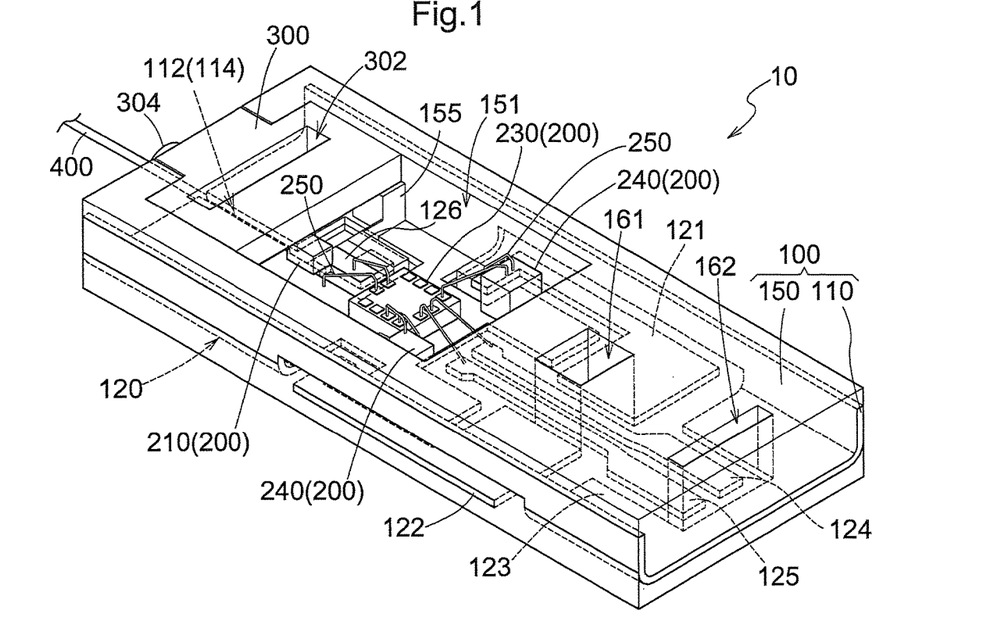
FIG. 1 is a perspective view as seen from a top face, showing a state in which an optical fiber is attached to a transmitting optical transmission module relating to an embodiment.
Figure 2:
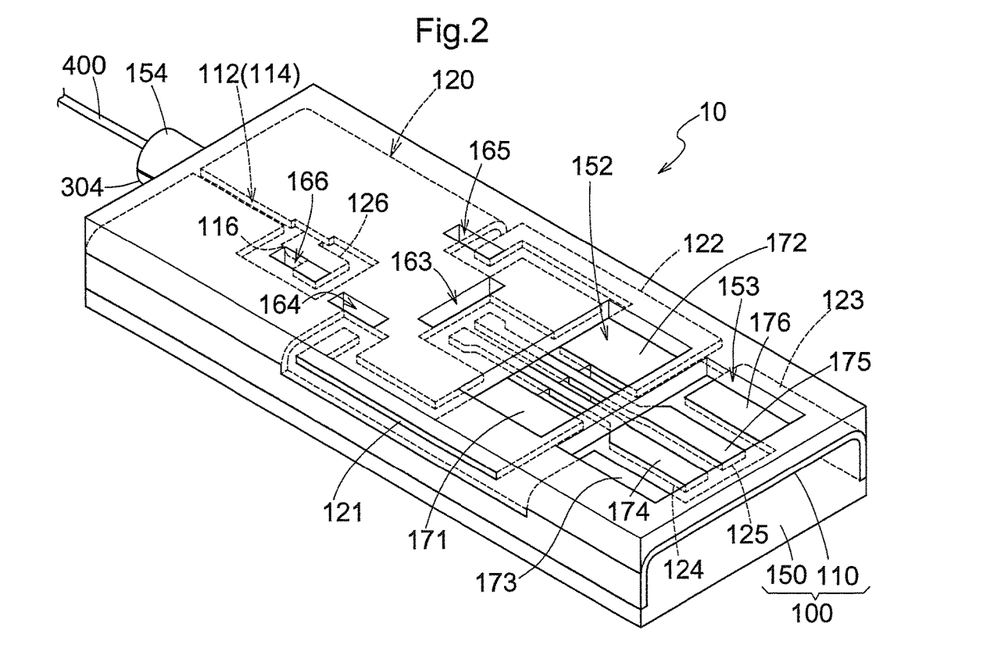
FIG. 2 is a perspective view as seen from a bottom face, showing a state in which the optical fiber is attached to the transmitting optical transmission module.
Figure 3:
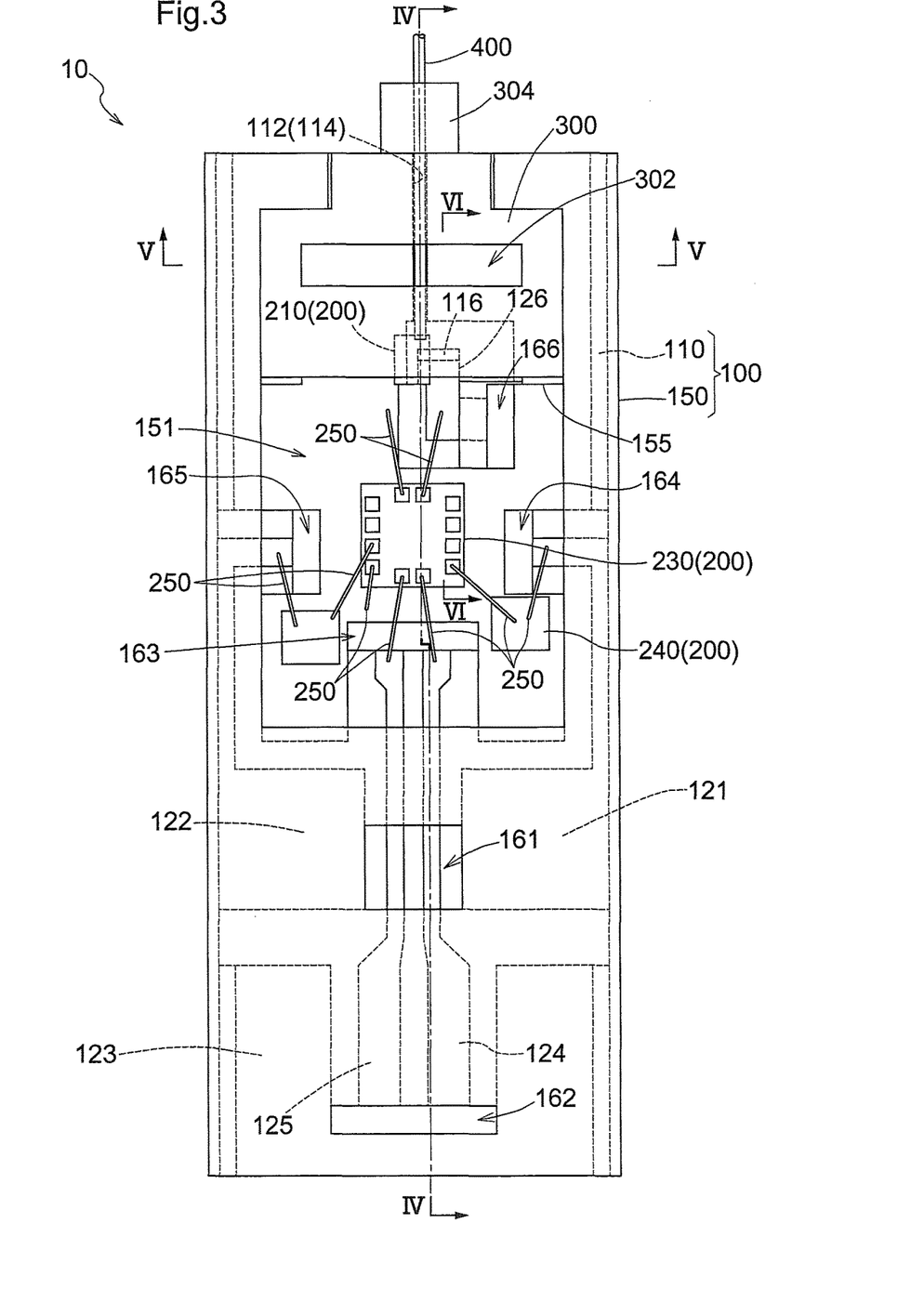
FIG. 3 is a plane view showing a state in which the optical fiber is attached to the transmitting optical transmission module.

Next, embodiments of this disclosure will be described in details with reference to the accompanying drawings. As shown in FIGS. 1 through 3, a transmitting optical transmission module 10 according to one embodiment includes a base 100, electronic devices 200 mounted on the base 100, and a cover 300. In its actual use, an optical fiber 400 is inserted and fixed to the transmitting optical transmission module 10. The electronic devices 200 include a surface emitting laser (to be referred to as "VCSEL" (Vertical Cavity Surface Emitting Laser) hereinafter) 210, a driver 230 for driving the VCSEL 210, and two decoupling capacitors (to be referred to as "capacitors" hereinafter) 240, 240. FIGS. 1 through 3 show a state in which the optical fiber 400 is attached. In the following discussion, terminologies relating to top/bottom, right/left and front/rear orientations are based on the FIG. 1 illustration. That is, the side to which the optical fiber 400 is attached will be referred to as the front side and the side on which the electronic devices 200 are mounted will be referred to as the top (or surface) side.

The base 100 includes a lead frame 110 formed of a thin plate of metal having high electric conductivity such as copper alloy, and a housing 150 formed of resin with insert-molding of the lead frame 110. As shown in FIG. 1 and FIG. 2, the lead frame 100 has its opposed ends parallel with a longitudinal direction (front/rear direction) of the transmitting optical transmission module 10, bent vertically, thus presenting an approximately U-shaped cross section perpendicular to the longitudinal direction. With this lead frame 110, sufficient mechanical strength is secured by the above-described approximately U-shaped bending of its opposed ends and its circumference being covered by the housing 150.

The housing 150 is formed so as to cover the lead frame 110 entirely, with its rein material entering gaps of this lead frame 110 also. A portion of the housing 150 is receded to form a first cavity 151. In this first cavity 151, the lead frame 110 is exposed. In this portion of the lead frame 110 exposed in the first cavity 151, the electronic devices 200 are mounted by flip chip bonding technique. Further, portions of electrodes of the mounted driver 230 and the mounted capacitors 240 are connected respectively to the other counterpart electrodes or the lead frame 110 through bonding of wires 250. In this way, the lead frame 110 is configured to function as an electric wiring pattern for forming an electric circuit for photoelectric conversion.

Figure 4:
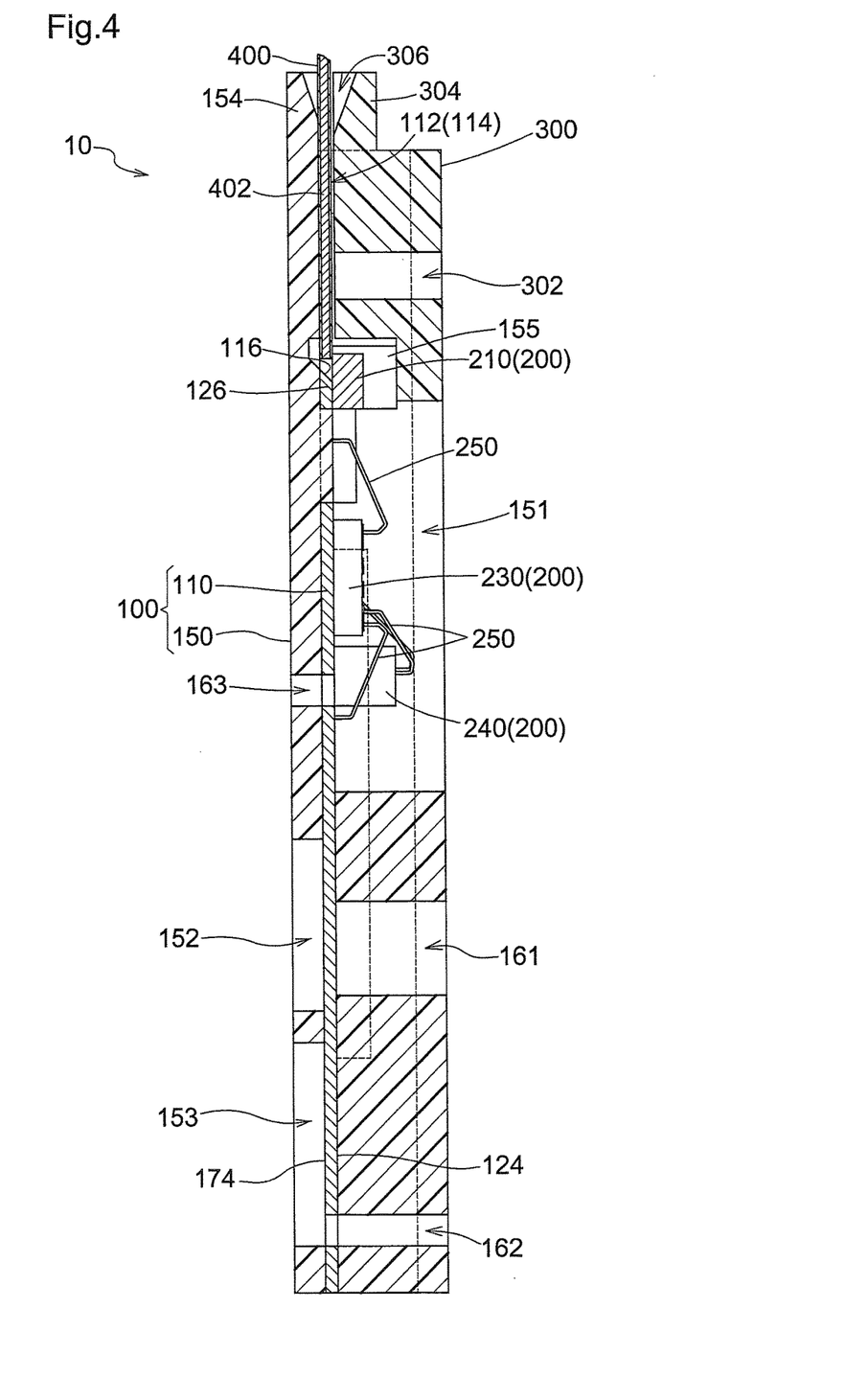
FIG. 4 is a section view taken along a line IV-IV in FIG. 3.

As shown in FIG. 3 and FIG. 4, in the housing 150, rearwardly of the first cavity 151, there are formed a first hole 161 and a second hole 162 which holes extend therethrough from the top side to the bottom side. Further, in the portion of the lead frame 110 exposed through the first cavity 151 also, there are formed a third hole 163, a fourth hole 164, a fifth hole 165 and a sixth hole 166 which holes extend therethrough from the lead frame 110 top side to the hosing 150 bottom side. These will be described in details later herein.

As shown in FIG. 2, on the bottom face side of the base 100 too, by being recessed due to local absence of resin charging, there are formed a second cavity 152 and a third cavity 153 where portions of the lead frame 110 are exposed. In the second cavity 152, a portion of a first lead 121 constituting the lead frame 110 functions as a first contact 171 and a portion of a second lead 122 constituting the same functions as a second contact 172, respectively. In the third cavity 153, portions of a third lead 123 constituting the lead frame 110 function as a third contact 173 and a six contact 176, and a portion of a fourth lead 124 functions as a fourth contact 174 and a portion of a fifth lead 125 functions as a fifth contact 175, respectively. These first through sixth contacts 171-176 are electrically connected to spring contacts constituting unillustrated connectors to which the transmitting optical transmission module 10 is fitted. Incidentally, the first through sixth contacts 171-176 are examples of contacts.

Figure 5:
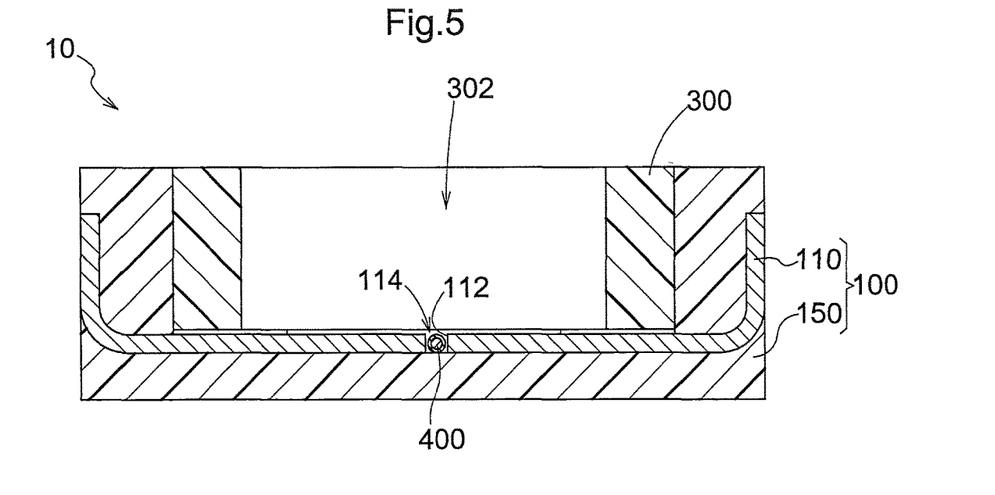
FIG. 5 is a section view taken along a line V-V in FIG. 3.

As shown in FIGS. 3 through 5, the lead frame 110 in the first cavity 151 defines a slit 112, whose one face is filled by the housing 150, thus forming a groove-like structure. The housing 150 includes a semi-circular guide portion 154 extending further outwards from an end of the slit 112. The guide portion 154 is formed such that its center is formed flush with the surface of the lead frame 110 and the guide portion 154 includes inside thereof a semi-circular tapered portion extending outwards from an end of the slit 112.

Inside the first cavity 151, a cover 300 formed of a transparent resin such as acryl or the like is fixed by a UV curable adhesive agent or the like in such a manner to cover the first cavity 151 entirely in a direction of right/left width, including the slit 112 and the VCSEL 210. As shown in FIG. 4, a portion of the cover 300 covering the position where the VCSEL 210 is mounted is disposed away from the lead frame 110 so as not to contact the VCSEL 210 and this portion is supported to protrusions 155 provided at two positions and protruding from the housing 150 toward the first cavity 151. Further, in the vicinity of the center of the cover 300 as seen from above, there is defined a through hole 302 extending through to the lead frame 110. Further, the cover 300 includes a semi-circular guide portion 304 extending further outwards from an end face of the housing 150. The guide portion 304 is formed such that its center is formed flush with the surface of the lead frame 110 and the guide portion 304 includes inside thereof a semi-circular tapered portion extending outwards from an end of the slit 112. As the guide portion 304 comes into contact with the guide portion 154 of the housing 150 such that the respective tapered portions thereof become integral with each other, there is formed a conical guide opening 306 for guiding the optical fiber 400.

In continuation from the guide opening 306, the cover 300, the slit 112 and the housing 150 together form a guide hole 114 in which the optical fiber 400 is inserted and fixed in position. Since the guide opening 306 has an outermost diameter which is much larger than an inner size of the guide hole 114, the optical fiber 400 can be inserted in a reliable manner from the guide opening 306 into the guide hole 114. The optical fiber 400 thus inserted is fixedly attached to the guide hole 114 with UV curable adhesive agent or the like.

Figure 6:
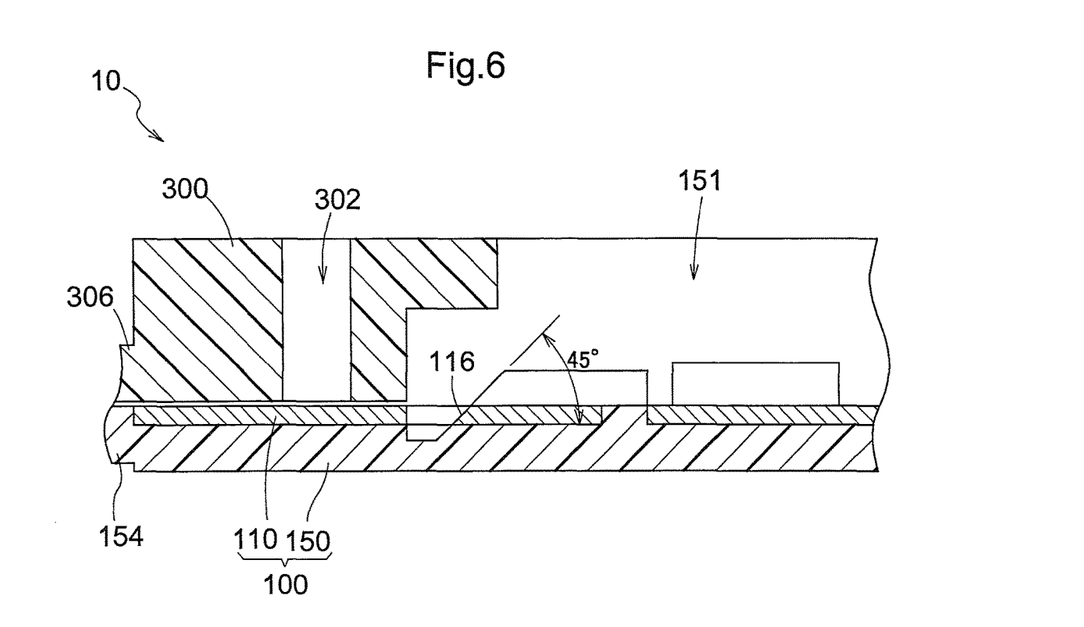
FIG. 6 is a section view taken along a line VI-VI in FIG. 3.

As shown in FIG. 4, an end of the optical fiber 400 is placed in opposition to a reflection mirror 116 formed in the lead frame 110 inside the transmitting optical transmission module 10. The VCSEL 210 is disposed perpendicularly upwardly of the reflection mirror 116. As shown in FIG. 6, the reflection mirror 116 has a 45 degree inclination relative to the inserting direction of the optical fiber 400. With this arrangement, it becomes possible to cause a beam emitted from the VCSEL 210 to be reflected by the reflection mirror 116 then to be incident on a core 402 of the optical fiber 400.

In the instant embodiment, the reflection mirror 116 has a flat face having the 45 degree inclination. However, the present disclosure is not limited thereto. Alternatively, the reflection mirror 116 may have a recessed face by depressing its center portion, thereby to provide a function of condensing beam simultaneously with reflecting the beam.

Next, an operation of the transmitting optical transmission module 10 will be explained. An electric signal transmitted from the outside of the transmitting optical transmission module 10 is inputted to this transmitting optical transmission module 10 via at least one of the first through sixth contacts 171-176. The electric signal thus inputted is converted into an optical signal by the VCSEL 210 and emitted as such therefrom. This optical signal is then reflected by the reflection mirror 116 and then propagated inside the core 402 of the optical fiber 400 to be transmitted eventually to the outside.

2. Method of Assembling Transmitting Optical Transmission Module

Figure 7:
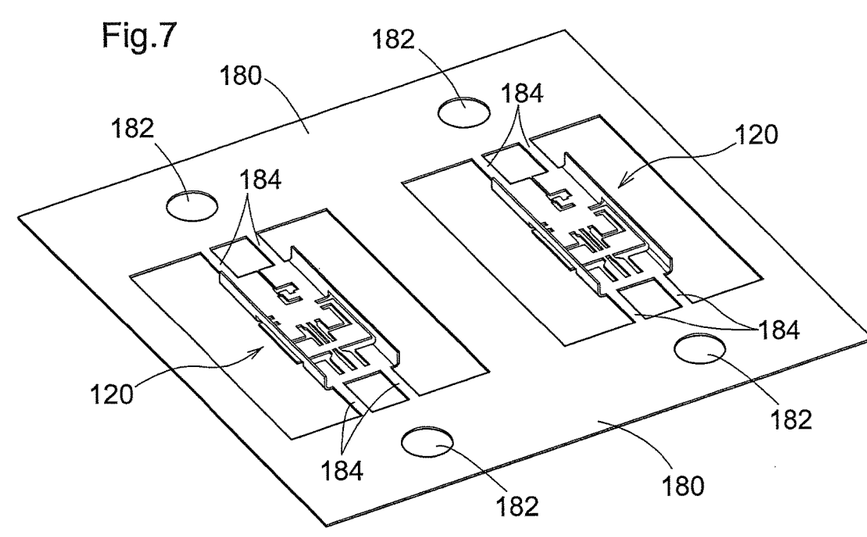
FIG. 7 is a perspective view as seen from a top face, showing a configuration of a lead frame body after completion of a press work, with a carrier being attached thereto.

Next, a method of assembling the transmitting optical transmission module 10 will be described in details with reference to the accompanying drawings. As shown in FIG. 7, the lead frame 110 is worked such that carriers 180 are formed with pilot holes 182 disposed at opposed ends of an elongate thin metal plate. In the illustration of FIG. 7, the lead frame 110 is held by four arm portions 184 formed to extend inwards from the carriers 180 on the opposed sides and the lead frame 110 is cut in the unit of two for insert-molding of the housing 150.

Figure 8:
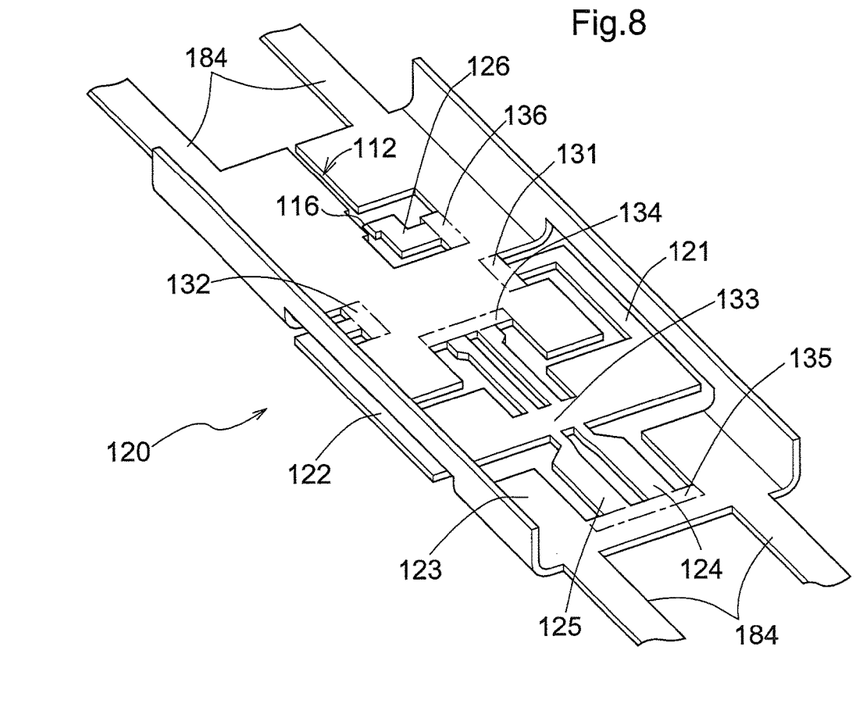
FIG. 8 is a partially enlarged view of FIG. 7.

As shown in FIG. 8, the lead frame 110 is formed by effecting press works by a series of unillustrated press molds on a lead frame body 120. By effecting punching works on the lead frame body 120, the first through fifth leads 121-125, the sixth lead 126 on which the VCSEL 210 is mounted and the slit 112 are formed.

The first lead 121, the second lead 122, and the fourth through sixth leads 124-126 are to be electrically isolated from the lead frame body 120 eventually. In this stage prior to insert molding, however, the first lead 121, the second lead 122, and the fourth through sixth leads 124-126 are still connected partially to the lead frame body 120. More particularly, regarding the first lead 121 and the second lead 122, respective one-side ends thereof are held as being continuous with the other portion of the lead frame body 120 via a first holding portion 131 and a second holding portion 132 and respective other-side ends thereof are held continuous with center portions of the fourth lead 124 and the fifth lead 125 via a third holding portion 133. Opposed end portions of the fourth lead 124 and the fifth lead 125 are held as being continuous with other portions of the lead frame 110 via a fourth holding portion 134 and a fifth holding portion 135, respectively. Regarding the sixth lead 126, one end portion thereof is held as being continuous with the lead frame body 120 via a sixth holding portion 136.

At the end portion of the sixth lead 126 opposite the sixth holding portion 136, the reflection mirror 116 is formed by surface machining work by an unillustrated punch. The reflection mirror 116 is disposed in opposition to the slit 112. In the instant embodiment, the reflection mirror 116 is formed by surface machining work. Instead, this mirror 116 can be formed by bending also.

As shown in FIG. 8, the opposed longitudinal ends of the lead frame body 120 except for those portions thereof forming the first lead 121 and the second lead 122 are bent vertically, so that the lead frame body 120 has an approximately U-shaped cross section perpendicular to the longitudinal direction of this lead frame body 120.

Figure 9A:
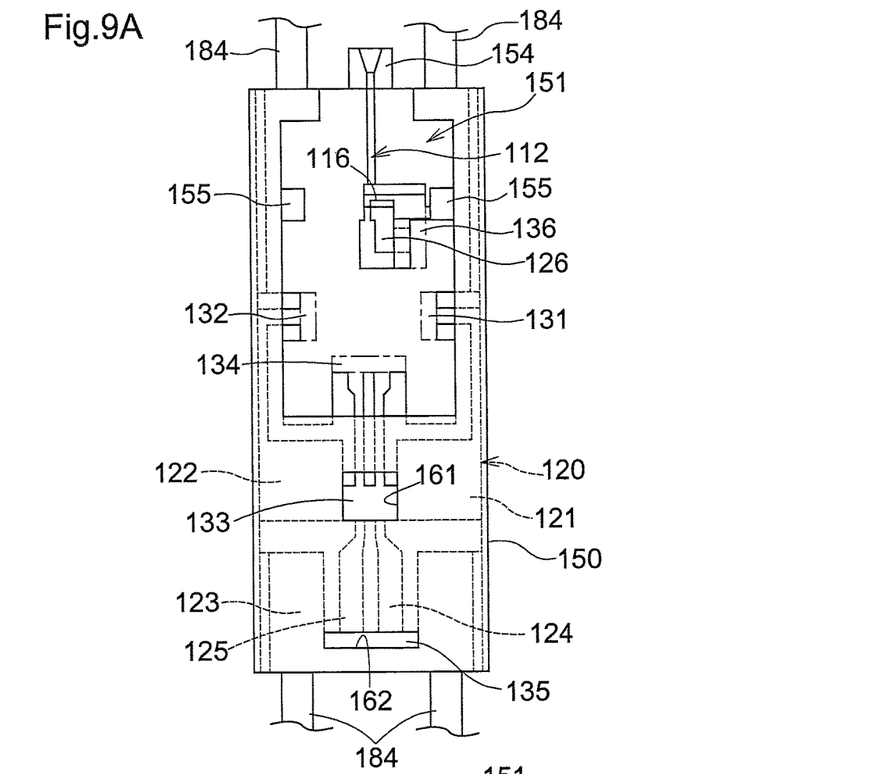
FIG. 9A is a plan view as seen from a top face, showing a state upon completion of insert-molding to the lead frame body.
Figure 9B:
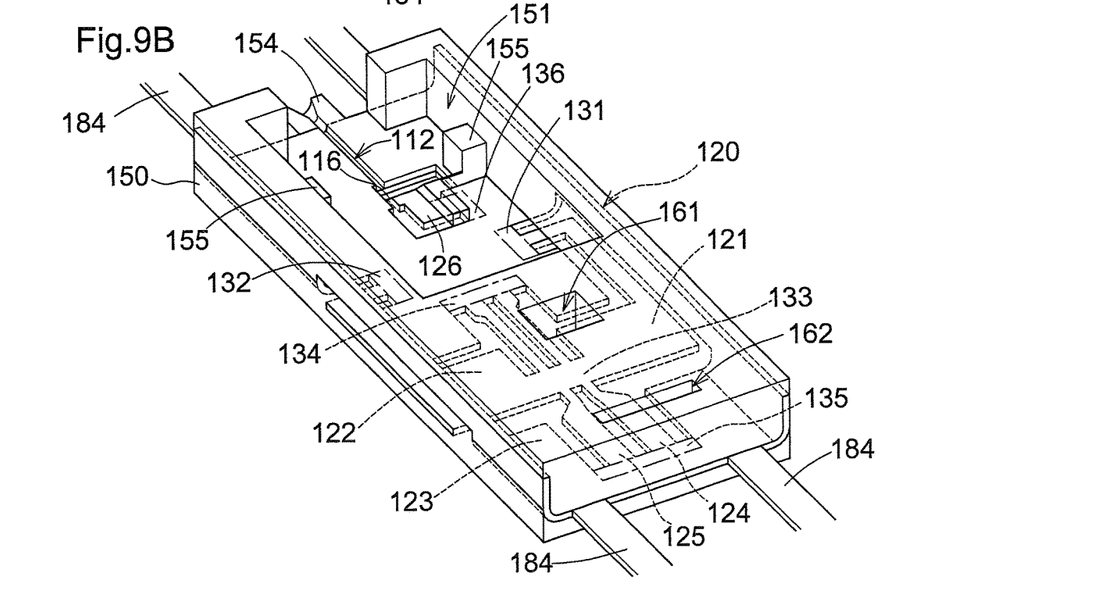
FIG. 9B is a perspective view as seen from the top face, showing the state upon completion of insert-molding to the lead frame body.

Next, the lead frame body 120 kept continuous with the carrier 180 such as the one shown in FIG. 7 is placed within an injection molding mold and the housing 150 is formed by insert molding. As shown in FIGS. 9A and 9B, by this insert molding, the first cavity 151, the second cavity 152, the third cavity 153, the first hole 161 and the second hold 162 will be formed. But, the third through sixth holes 163-166 are not yet formed. Also, the first lead 121, the second lead 122, and the fourth through six leads 124-126 are all still continuous with the other portion of the lead frame body 120.

Figure 10A:
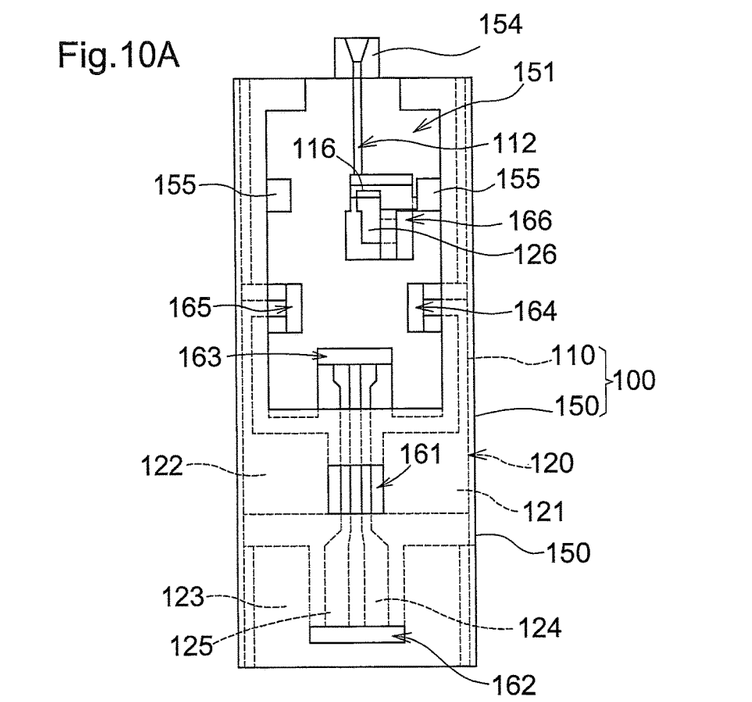
FIG. 10A is a plan view showing a base as seen from its top face.
Figure 10B:
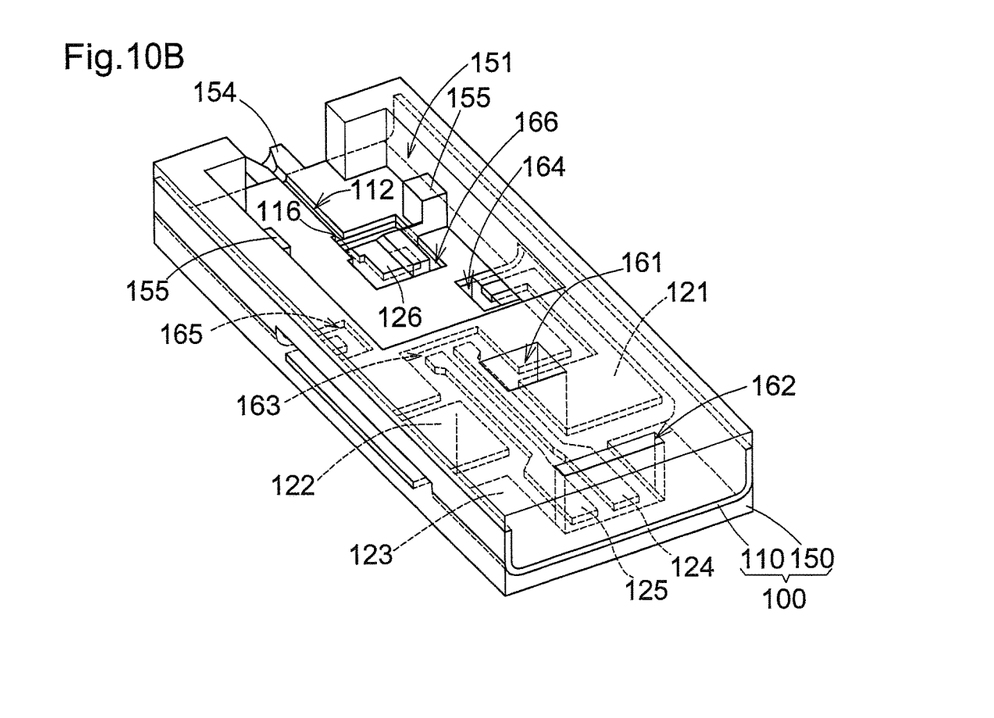
FIG. 10B is a perspective view showing the base as seen from its top face.

Next, the lead frame 110 covered by the housing 150 as being kept continuous with the carrier 180 as shown in FIGS. 9A and 9B will be placed in a single press mold. Then, by a punching work of the mold, the first through sixth holding portions 131-136 will be punched out. With this, the third through sixth holes 163-166 will be formed, and also the first lead 121, the second lead 122, and the fourth through sixth leads 124-126 become electrically isolated from the lead frame body 120. With this, the lead frame 110 is completed. At the same time, the lead frame body 120 becomes now separated from the arm portions 184 and the base 110 is cut off the carrier 180. With this, as shown in FIGS. 10A and 10B, the base 110 is completed. No displacement or detachment of the first lead 121, the second lead 122 and the fourth through sixth leads 124-126 will occur, even without the first through sixth holding portions 131-136, since the other portions thereof are fixed by the housing 150.

Figure 11:
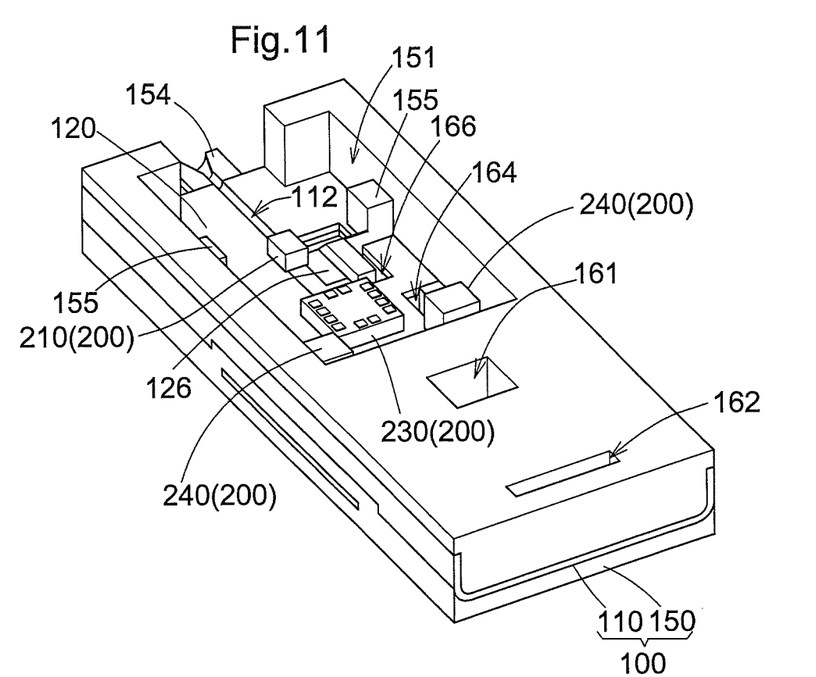
FIG. 11 is a perspective view showing a state in which electronic devices are mounted on the base as seen from the top face.
Figure 12:
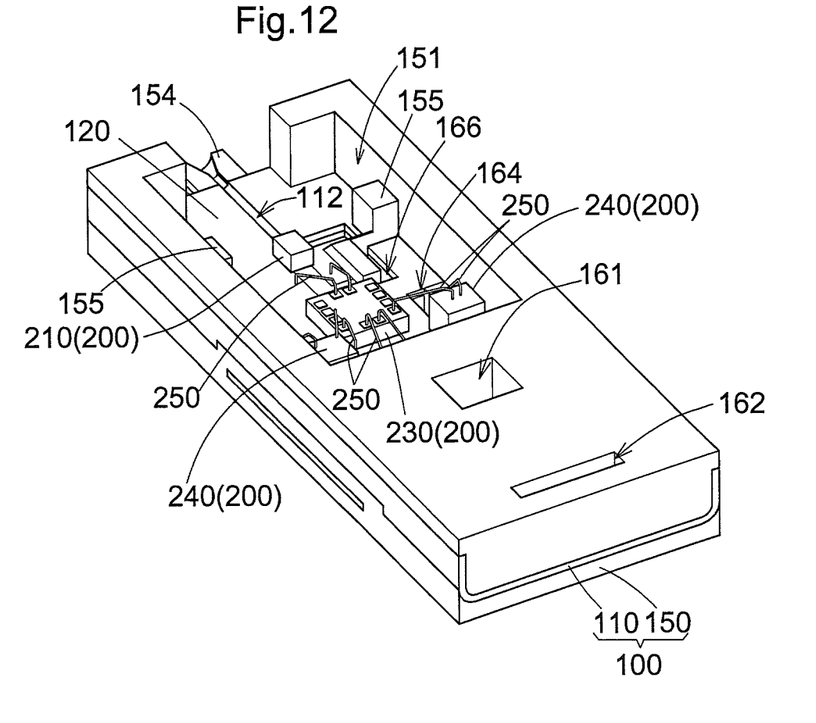
FIG. 12 is a perspective view showing a state in which wires are bonded to the electronic devices as seen from the top face.
Figure 13:
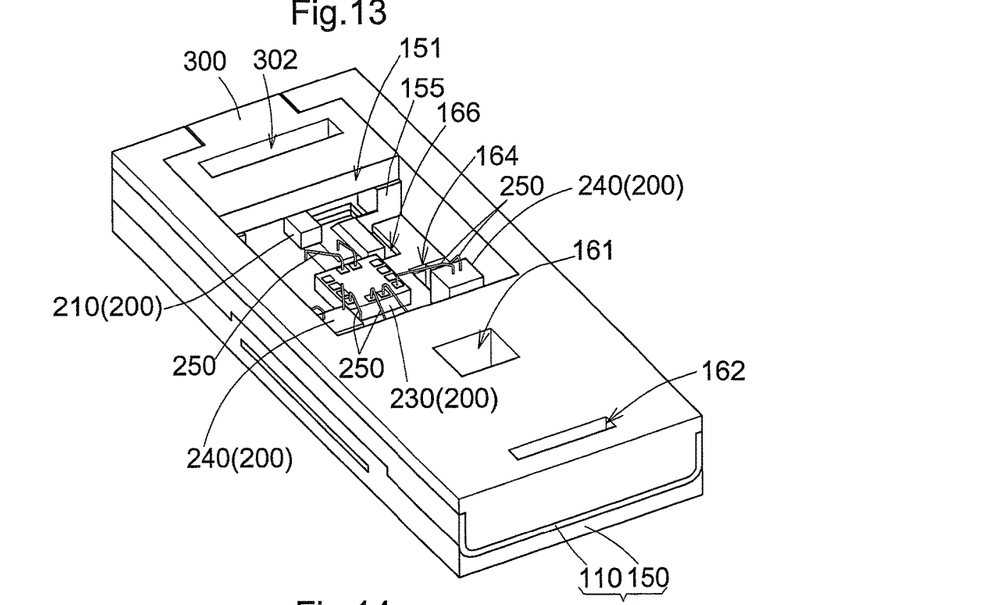
FIG. 13 is a perspective view showing a transmitting optical transmission module as seen from the top face thereof.

Next, as shown in FIG. 11, the VCSEL 210, the driver 230, and the capacitors 240, 240 are mounted to the lead frame 110 by the flip bonding technique. Next, as shown in FIG. 12, portions of electrodes on the top face sides of the driver 230 and the capacitors 240, 240 are connected respectively to the counterpart electrodes or the lead frame 110 by bonding of the wires 250. Next, as shown in FIG. 13, the cover 300 is fixed by e.g. UV curable adhesive agent in such a manner to cover the slit 112 inside the first cavity 151. With this, the transmitting optical transmission mole 10 is completed. At the time of its actual use, as shown in FIG. 1, the optical fiber 400 will be inserted into the guide hole 114 and fixed by e.g. UV curable adhesive agent or the like.

As described above, in the transmitting optical transmission module 10 relating to this embodiment, the lead frame 110 is employed instead of an SiOB. Therefore, this transmitting optical transmission module 10 can be manufactured inexpensively. Further, since the lead frame 110 including the slit 112 for positioning the optical fiber 400 and including also the reflection mirror 116 for reflecting light signal is formed by press works, there is achieved higher positional precision of the slit 112 and the reflection mirror 116 compared with a case of forming these in resin. Moreover, there is no need to use any additional members for the positioning of the optical fiber 400 and the forming of the reflection mirror 116. Furthermore, since the electronic devices 200 are directly mounted to the lead frame 110, there is no need for any additional wiring also. With these combined, it has become possible to manufacture an inexpensive and compact transmitting optical transmission module 10 having high coupling efficiency between the optical fiber 400 and the VCSEL 210. Further, since the first through sixth contacts 171-176 for inputting/outputting electric signals from/to the outside are formed by the lead frame 110, there is no need to form the first through sixth contacts 171-176 by some additional members or additional wiring. Thus, the transmitting optical transmission module 10 can be manufactured even more inexpensively. In addition, the arrangement of setting the angle of the reflection mirror 116 to 45 degrees has enabled its forming by punching or bending of the lead frame 110, so that there is no need for additional step such as laser beam irradiation or dicing for forming the reflection mirror 116. Thus, the transmitting optical transmission module 10 can be manufactured even more inexpensively.

With the transmitting optical transmission module 10 relating to this embodiment, the base 100 is constituted by forming the housing 150 with insertion molding with opposed ends of the lead frame 110 being bent in the approximate U-shape. Therefore, necessary and sufficient mechanical strength for a product can be secured.

3. Configuration of Receiving Optical Transmission Module

Figure 14:
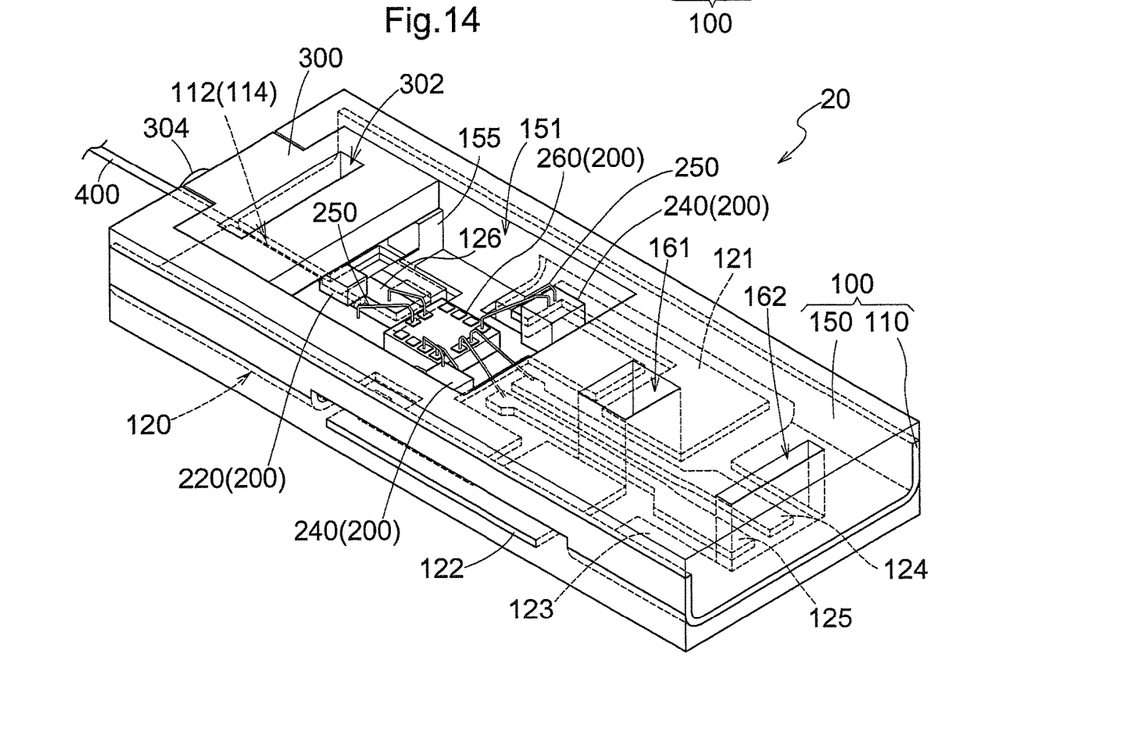
FIG. 14 is a perspective view as seen from a top face, showing a state in which an optical fiber is attached to a receiving optical transmission module relating to the embodiment.

Next, a configuration of a receiving optical transmission module 20 will be explained with reference to the accompanying drawings. As shown in FIG. 14, the configuration of the receiving optical transmission module 20 is almost identical to that of the transmitting optical transmission module 10. In the case of the receiving optical transmission module 20, however, instead of the VCSEL 210, a photodiode (to be referred to as "PD" hereinafter) 220 as a light receiving element is mounted and also instead of the driver 230, a transimpedance amplifier 260 converting a current of the PD 220 into a voltage and outputting this voltage is mounted. The rest of the configuration is identical to that of the transmitting optical transmission module 10. Regarding the method of assembly of the receiving optical transmission module 20 too, the method is same as the assembly method of the transmitting optical transmission module 10.

With the receiving optical transmission module 20 in operation, an optical signal from the outside which has been propagated through and emitted from the core 402 of the optical fiber 400 is reflected by the reflection mirror 116 to be incident on a light receiving face of the PD 220. This incident optical signal is then converted into an electric signal by the PD 220. The electric signal thus converted is then amplified by the transimpedance amplifier 260 and then outputted to the outside of the receiving optical transmission module 20 via at least one of the first through sixth contacts 171-176.

In the foregoing explanation of the embodiment, there have been explained optical transmission modules for one way communication such as the transmitting optical transmission module 10 and the receiving optical transmission module 20. However, the disclosure is not limited thereto. Needless to say, it is possible to configure an optical transmission module for two-way communication with using components of one package enclosing therein the VCSEL 210 and the PD 220 and one package enclosing the driver 230 and the transimpedance amplifier 260.

The invention claimed is:
1. An optical transmission module comprising:
a lead frame including an electric wiring pattern formed therein;
a resin housing formed through insert-molding of the lead frame;

an electric device mounted on one face of the lead frame and including a light projecting element and/or light receiving element for photoelectric conversion; and the lead frame forming a slit positioning an optical fiber to be coupled to the light projecting element and/or light receiving element, and a reflection mirror reflecting light from the light projecting element to the optical fiber and/or light from the optical fiber to the light receiving element.

2. The optical transmission module according to claim 1, wherein on the other face of the lead frame, a contact for input/output of an electric signal is provided.

3. The optical transmission module according to claim 2, wherein the lead frame is formed by press work and the reflection mirror is formed by surface machining during the press work.

4. The optical transmission module according to claim 3, wherein the electronic device includes a surface emitting laser as the light projecting element, a photodiode as the light receiving element, a driver for driving the surface emitting laser, and a transimpedance amplifier converting a current from the photodiode into a voltage and outputting this voltage.

5. The optical transmission module according to claim 2, wherein the lead frame is formed by press work and the reflection mirror is formed by bending during the press work.

6. The optical transmission module according to claim 5, wherein the electronic device includes a surface emitting laser as the light projecting element, a photodiode as the light receiving element, a driver for driving the surface emitting laser, and a transimpedance amplifier converting a current from the photodiode into a voltage and outputting this voltage.

7. The optical transmission module according to claim 2, wherein the electronic device includes a surface emitting laser as the light projecting element, a photodiode as the light receiving element, a driver for driving the surface emitting laser, and a transimpedance amplifier converting a current from the photodiode into a voltage and outputting this voltage.

8. The optical transmission module according to claim 1, wherein the lead frame is formed by press work and the reflection mirror is formed by surface machining during the press work.

9. The optical transmission module according to claim 8, wherein the electronic device includes a surface emitting laser as the light projecting element, a photodiode as the light receiving element, a driver for driving the surface emitting laser, and a transimpedance amplifier converting a current from the photodiode into a voltage and outputting this voltage.

10. The optical transmission module according to claim 1, wherein the lead frame is formed by press work and the reflection mirror is formed by bending during the press work.

11. The optical transmission module according to claim 10, wherein the electronic device includes a surface emitting laser as the light projecting element, a photodiode as the light receiving element, a driver for driving the surface emitting laser, and a transimpedance amplifier converting a current from the photodiode into a voltage and outputting this voltage.

12. The optical transmission module according to claim 1, wherein the electronic device includes a surface emitting laser as the light projecting element, a photodiode as the light receiving element, a driver for driving the surface emitting laser, and a transimpedance amplifier converting a current from the photodiode into a voltage and outputting this voltage.

* * * * *